(12) United States Patent
Podpaly et al.

(10) Patent No.: US 9,989,167 B2
(45) Date of Patent: Jun. 5, 2018

(54) VALVE POSITIONER COMMUNICATION METHOD AND APPARATUS

(71) Applicant: Dresser, Inc., Addison, TX (US)

(72) Inventors: Anatoly Podpaly, Sharon, MA (US); Justin Scott Shriver, Newton, MA (US)

(73) Assignee: Dresser, Inc., Addison, TX (US)

( * ) Notice: Subject to any disclaimer, the term of this patent is extended or adjusted under 35 U.S.C. 154(b) by 72 days.

(21) Appl. No.: 14/635,068

(22) Filed: Mar. 2, 2015

(65) Prior Publication Data

US 2016/0258549 A1 Sep. 8, 2016

(51) Int. Cl.
*F16K 37/00* (2006.01)

(52) U.S. Cl.
CPC ................ *F16K 37/0058* (2013.01)

(58) Field of Classification Search
CPC .................................. F16K 37/0058
See application file for complete search history.

(56) References Cited

U.S. PATENT DOCUMENTS

| | | | | |
|---|---|---|---|---|
| 5,223,822 A * | 6/1993 | Stommes | ............ | F16K 37/0008 116/277 |
| 7,062,177 B1 * | 6/2006 | Grivna | ............... | H04B 10/2581 398/16 |
| 8,091,860 B2 * | 1/2012 | Thompson | .............. | F16K 3/246 137/554 |
| 8,644,996 B2 * | 2/2014 | Inagaki | ............... | F16K 37/0066 137/487.5 |
| 8,909,022 B1 * | 12/2014 | Kasten | ................... | H04N 5/772 386/227 |
| 2002/0067341 A1 * | 6/2002 | Kobayashi | ............ | G06F 3/0308 345/157 |
| 2002/0131121 A1 * | 9/2002 | Jeganathan | ........ | H04B 10/1127 398/128 |

OTHER PUBLICATIONS

Little et al, "Using LED Lighting for Ubiquitous Indoor Wireless Networking", MCL Technical report No. TR-05-20-2008, Published Jun. 1 2008.*

* cited by examiner

*Primary Examiner* — Kevin Murphy
*Assistant Examiner* — Patrick Williams
(74) *Attorney, Agent, or Firm* — Paul Frank + Collins P.C.

(57) ABSTRACT

A valve positioning system controls a valve and exchanges information related to the valve. The valve positioning system includes a valve positioner in operative association with the valve such that the valve positioner receives status information related to the valve. The valve positioner includes one or more lights that are selectively illuminated in a predetermined order based on the status information. By selectively illuminating the one or more lights in the predetermined order, the valve positioner is optically transmits the status information to a computing device that is in a line of sight with the one or more lights of the valve positioner. A method of exchanging information related to a valve in a valve positioning system is also provided.

19 Claims, 6 Drawing Sheets

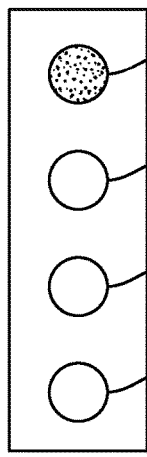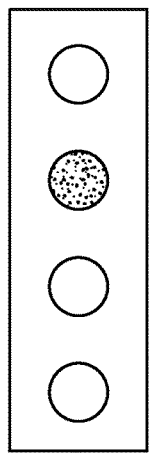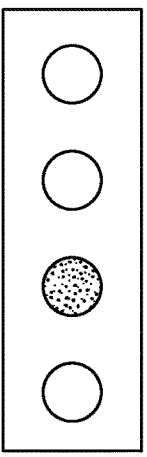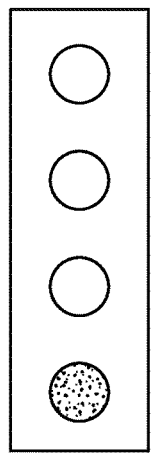
FIG. 4A   FIG. 4B   FIG. 4C   FIG. 4D
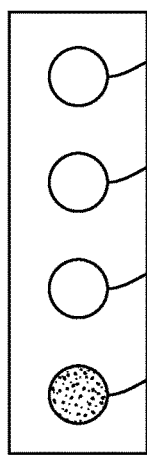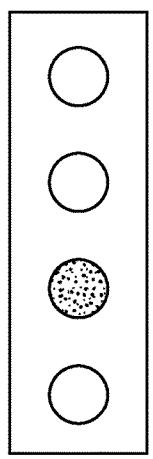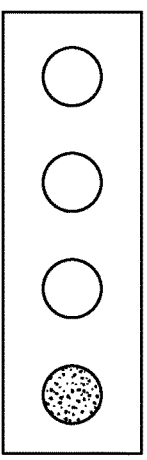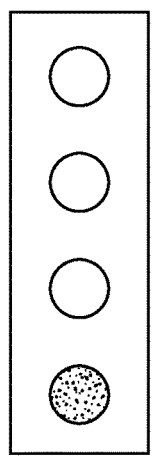
FIG. 5A   FIG. 5B   FIG. 5C   FIG. 5D

VALVE POSITIONER COMMUNICATION METHOD AND APPARATUS

BACKGROUND OF THE INVENTION

Field of the Invention

The invention relates to a valve positioner, and more particularly, relates to a valve positioner that optically communicates information related to a valve.

Discussion of Prior Art

Valves can be used to control fluid flow, steam flow, gas flow, etc. by moving between an opened position, a partially opened position, and a closed position. When the valve is in the opened position and/or the partially opened position, fluid flow, steam flow, gas flow, etc. can move through a pipe, tube, etc. past the valve. When the valve is in the closed position, fluid flow, steam flow, gas flow, etc. is prevented from moving through the pipe, tube, etc. past the valve. To control the position of a valve, an actuator may be provided. In some examples, the actuator includes a pneumatic actuator that converts energy (e.g., compressed air) into mechanical motion that causes the valve to move between the opened position, the partially opened position, and the closed position.

At times, information related to the valve, the actuator, etc. can be transmitted to a user. Similarly, information, such as control information, can be transmitted from the user to a valve positioning system. Due to a large number of valves in a small area, wireless transmission (e.g., using Bluetooth, radio waves, etc.) of this information can be challenging. For example, a wireless device (e.g., mobile device, etc.) that is used by the user can inadvertently communicate with multiple and/or unintended valve positioning systems within the same area (e.g., crosstalk). Thus, it would be useful to provide a valve positioning system that can communicate with a computing device when the computing device is in a line of sight with the valve positioning system, thus: (1) limiting the likelihood of crosstalk; (2) limiting and/or eliminating the potential for malicious interception (e.g., eavesdropping); and (3) increasing security since the line of sight communication can have direct physical access to the resource.

BRIEF DESCRIPTION OF THE INVENTION

The following summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

In accordance with one aspect, the present invention provides a valve positioning system for controlling a valve and exchanging information related to the valve. The valve positioning system includes a valve positioner in operative association with the valve such that the valve positioner is configured to receive status information related to the valve. The valve positioner includes one or more lights that are configured to be selectively illuminated in a predetermined order based on the status information. By selectively illuminating the one or more lights in the predetermined order, the valve positioner is configured to optically transmit the status information to a computing device that is in a line of sight with the one or more lights of the valve positioner.

In accordance with another aspect, the present invention provides a valve positioning system for controlling a valve and exchanging information related to the valve. The valve positioning system includes a valve positioner in operative association with the valve such that the valve positioner is configured to receive status information related to the valve. The valve positioner includes one or more lights that are configured to be selectively illuminated in a predetermined order based on the status information related to the valve. By selectively illuminating the one or more lights in the predetermined order, the valve positioner is configured to optically transmit the status information. The valve positioning system includes a photodetector configured to detect light, based on control information for controlling the valve positioner, that is generated by a computing device in a line of sight with the photodetector. Based on the detection of the light by the photodetector, the photodetector is configured to generate an electrical signal indicative of the control information.

In accordance with yet another aspect, the present invention provides a method of exchanging information related to a valve in a valve positioning system. The method includes receiving information at a valve positioner that is related to the valve. The method includes transmitting the information by selectively illuminating one or more lights in a predetermined order supported by the valve positioner. The method includes receiving control information by detecting light with a photodetector supported by the valve positioner.

BRIEF DESCRIPTION OF THE DRAWINGS

The foregoing and other aspects of the invention will become apparent to those skilled in the art to which the invention relates upon reading the following description with reference to the accompanying drawings, in which:

FIG. 4A is an example optical transmission component for optically communication information related to a valve in which a first light is illuminated;

FIG. 4B is an example optical transmission component for optically communication information related to a valve in which a second light is illuminated;

FIG. 4C is an example optical transmission component for optically communication information related to a valve in which a third light is illuminated;

FIG. 4D is an example optical transmission component for optically communication information related to a valve in which a fourth light is illuminated;

FIG. 5A is an example optical transmission component for optically communication information related to a valve in which a fourth light is illuminated;

FIG. 5B is an example optical transmission component for optically communication information related to a valve in which a third light is illuminated;

FIG. 5C is an example optical transmission component for optically communication information related to a valve in which a fourth light is illuminated;

FIG. 5D is an example optical transmission component for optically communication information related to a valve in which a fourth light is illuminated;

DETAILED DESCRIPTION OF THE INVENTION

Figure 1:
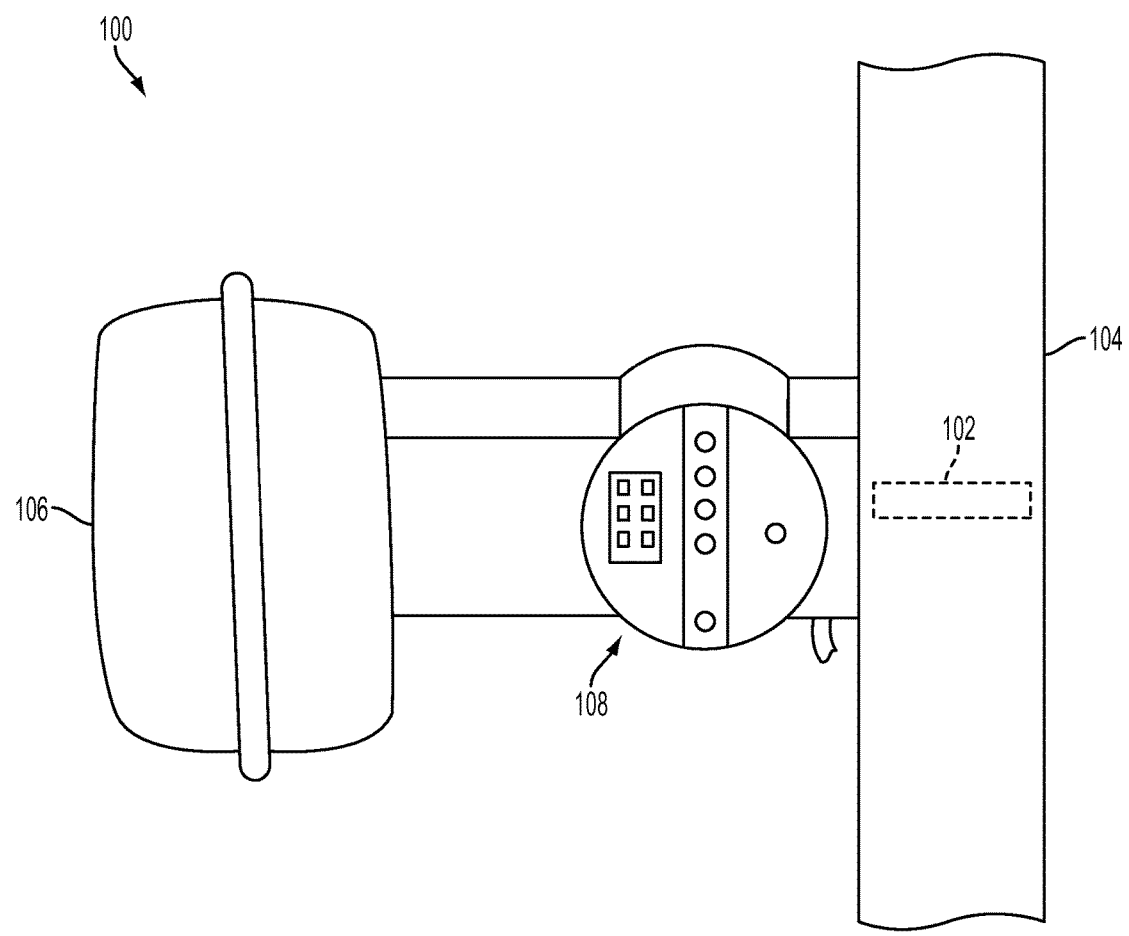
FIG. 1 is a perspective view of an example valve positioning system in accordance with at least one aspect of the present invention.

Example embodiments that incorporate one or more aspects of the invention are described and illustrated in the drawings. These illustrated examples are not intended to be a limitation on the invention. For example, one or more aspects of the invention can be utilized in other embodiments and even other types of devices. Moreover, certain terminology is used herein for convenience only and is not to be taken as a limitation on the invention. Still further, in the drawings, the same reference numerals are employed for designating the same elements.

FIG. 1 illustrates an example valve positioning system 100. The valve positioning system 100 can be used in a number of different environments. For example, the valve positioning system 100 can be used in association with a pipeline transportation system that includes the transportation of materials (e.g., liquids, gases, etc.) through a pipe.

The valve positioning system 100 can include a valve 102. It will be appreciated that the valve 102 is illustrated generically/schematically in FIG. 1 with dashed lines, as the valve 102 is normally not visible in such a view. Indeed, the valve 102 is not limited to the illustrated position, but, instead, is merely an example of where the valve 102 may be positioned. Further, the valve 102 is merely exemplary, and is not intended to convey a particular size, shape, location, etc., as the valve 102 includes any number of different sizes, shapes, locations, etc.

In an example, the valve 102 may be positioned within a pipe 104 through which the materials are transported. The valve 102 can selectively restrict flow of the materials through the pipe 104. For example, the valve 102 may be moveable between an opened position and a closed position. In the opened position, the valve 102 may not restrict the flow of materials through the pipe 104. In the closed position, the valve 102 may partially or completely restrict the flow of materials through the pipe 104. In some examples, in addition to the opened position and the closed position, the valve 102 can be moved to a partially opened position (e.g., neither fully opened nor fully closed).

The valve positioning system 100 includes an actuator 106. The actuator 106 can be in operative association with the valve 102, such as by being attached to the valve 102, for example. The actuator 106 can control the operation of the valve 102, such as by moving the valve 102 between the opened position, the partially opened position, and the closed position. In an example, the actuator 106 includes a pneumatic actuator, in which air pressure acts as the power source for moving the valve 102. In one possible example, the air pressure can act on a piston to provide thrust for moving the valve 102. In some examples, air moving in a first direction can move the valve 102 to the closed position while air moving in an opposing second direction can move the valve 102 to the opened position.

The valve positioning system 100 includes a valve positioner 108. The valve positioner is in operative association with the valve 102 and/or the actuator 106. By being in operative association, the valve positioner 108 can be connected to one or more sensors, cameras, pressure gauges, etc. that may be used to sense, detect, monitor, etc. a status of the valve 102 and/or the actuator 106. As such, in this example, the valve positioner 108 can receive status information related to the valve 102. For example, the status information that the valve positioner 108 can receive may include one or more of the following: a position of the valve 102 (e.g., opened position, partially opened position, closed position), position deviation of the valve 102 (e.g., how much an actual position of the valve 102 deviates from an intended position of the valve 102), a time history of the valve 102 (e.g., time that the valve 102 is in the opened position, partially opened position, or closed position), air supply information (e.g., air supply for the actuator 106 is too high or too low), errors and/or malfunctions related to the valve 102 and/or the actuator 106, etc.

Figure 2:
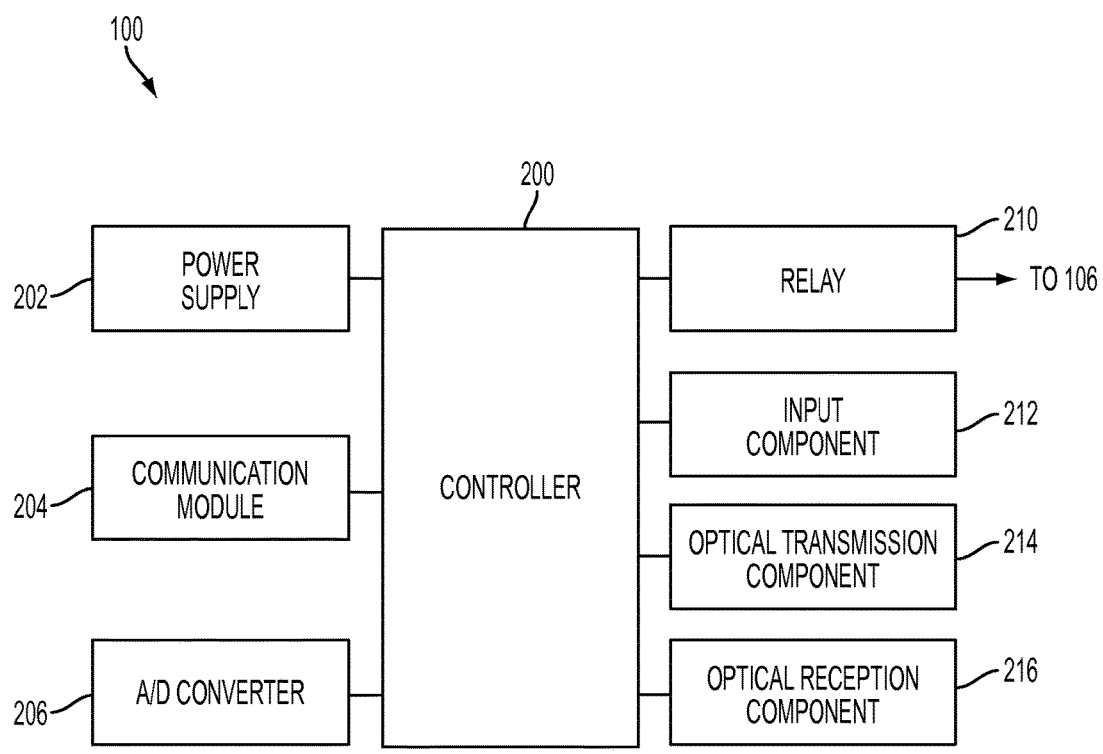
FIG. 2 is a schematized block diagram of example components within an example valve positioning system.

Turning to FIG. 2, a schematic representation of the valve positioning system 100 is illustrated. It will be appreciated that the schematic representation illustrates some, but not all, of the components, structures, etc. of the valve positioning system 100. Indeed, the valve positioning system 100 is not limited to the illustrated components, structures, etc. that are illustrated in FIG. 2, and, in other examples, may include other components, structures, etc.

The valve positioning system 100 includes a controller 200. In an example, the controller 200 may include a processor, memory, an input/output, circuitry, etc. In some examples, the controller 200 may include a microcontroller. The controller 200 may be supported within the valve positioner 108 (e.g., illustrated in FIG. 1), such as by being positioned within and/or supported by the valve positioner 108.

The valve positioning system 100 includes a power supply 202. The power supply 202 can be in operative association with the controller 200, such that the power supply 202 can supply electric power to one or more of the components of the valve positioning system 100. The power supply 202 includes any number of devices, including, but not limited to, electrical energy transmission systems, batteries, electromechanical power systems (e.g., generators, alternators, solar power cells, etc.), etc.

The valve positioning system 100 can include a communications module 204. The communications module 204 can be in operative association with the controller 200. In an example, the communications module 204 can send and/or receive data to and/or from the controller 200. Though not illustrated, the communications module 204 may include a microcontroller, memory, etc. In one possible example, the communications module 204 includes a Highway Addressable Remote Transducer ("HART") protocol. In such an example, the communications module 204 can send and/or receive digital information across analog wires between an external device and the controller 200. While the power supply 202 and the communications module 204 are illustrated as two separate components, in other examples, the power supply 202 and the communications module 204 may be comprised as part of a single component, such as a component that can transmit both power and data/information.

The valve positioning system 100 can include an analog-to-digital ("A/D") converter 206. The A/D converter 206 can be in operative association with the controller 200. In an example, the A/D converter 206 can convert between analog signals/data and digital signals/data before the signals/data are received by the controller 200. In an example, the data that is received by the controller 200 from either or both of the communications module 204 and/or the A/D converter 206 can include the status information that is related to the valve 102.

The valve positioning system 100 can include one or more relays 210. In the illustrated example, the relay 210 is in operative association with the controller 200, such as by being electrically connected to the controller 200. The relay 210 can be powered by the controller 200 and/or can be controlled by the controller 200. The relay 210 can be electrically connected to the actuator 106, such that the relay 210 can control the actuator 106. In this example, the controller 200, by being electrically connected to the relay 210, can control the actuator 106 and/or the valve 102.

The valve positioning system 100 can include an input component 212. In this example, the input component 212 is in operative association with the controller 200, such as by being electrically connected to the controller 200. The input component 212 can be supported by and/or attached to the valve positioner 108. In one example, the input component 212 includes any number of text entry devices, such as keyboards, keypads, wireless input devices, wired input devices (e.g., via a mobile device, tablet, handheld device, etc.), etc. In these examples, the input component 212 allows for a user to input information to the controller 200, such as control information, status information, data requests, on/off commands, etc.

The valve positioning system 100 can include an optical transmission component 214. The optical transmission component 214 is in operative association with the controller 200, such as by being electrically connected to the controller 200. In an example, the optical transmission component 214 can be supported by and/or attached to the valve positioner 108. As will be described in more detail below, in one example, the optical transmission component 214 includes one or more lights (e.g., light emitting diodes, etc.), etc. In an example, the optical transmission component 214 can transmit (e.g., optically transmit) information to a separate device from the valve positioning system 100, such as a computing device (e.g., mobile device, tablet, handheld device, etc.), for example.

The valve positioning system 100 can include an optical reception component 216. The optical reception component 216 is in operative association with the controller 200, such as by being electrically connected to the controller 200. In an example, the optical reception component 216 can be supported by and/or attached to the valve positioner 108. As will be described in more detail below, in one example, the optical reception component 216 may include a photodetector (e.g., a photodiode, photoresistor, phototransistor, etc.).

The optical reception component 216 can detect light that is emitted from a computing device (e.g., mobile device, tablet, handheld device, etc.). This light that is emitted from a computing device may be related to and/or indicative of information, such as control information, for example. The optical reception component 216 can detect this light and, in response, generate an electrical signal that is transmitted to the controller 200. The controller 200 can then carry out any instructions (e.g., control information) that were received by the optical reception component 216.

Figure 3:
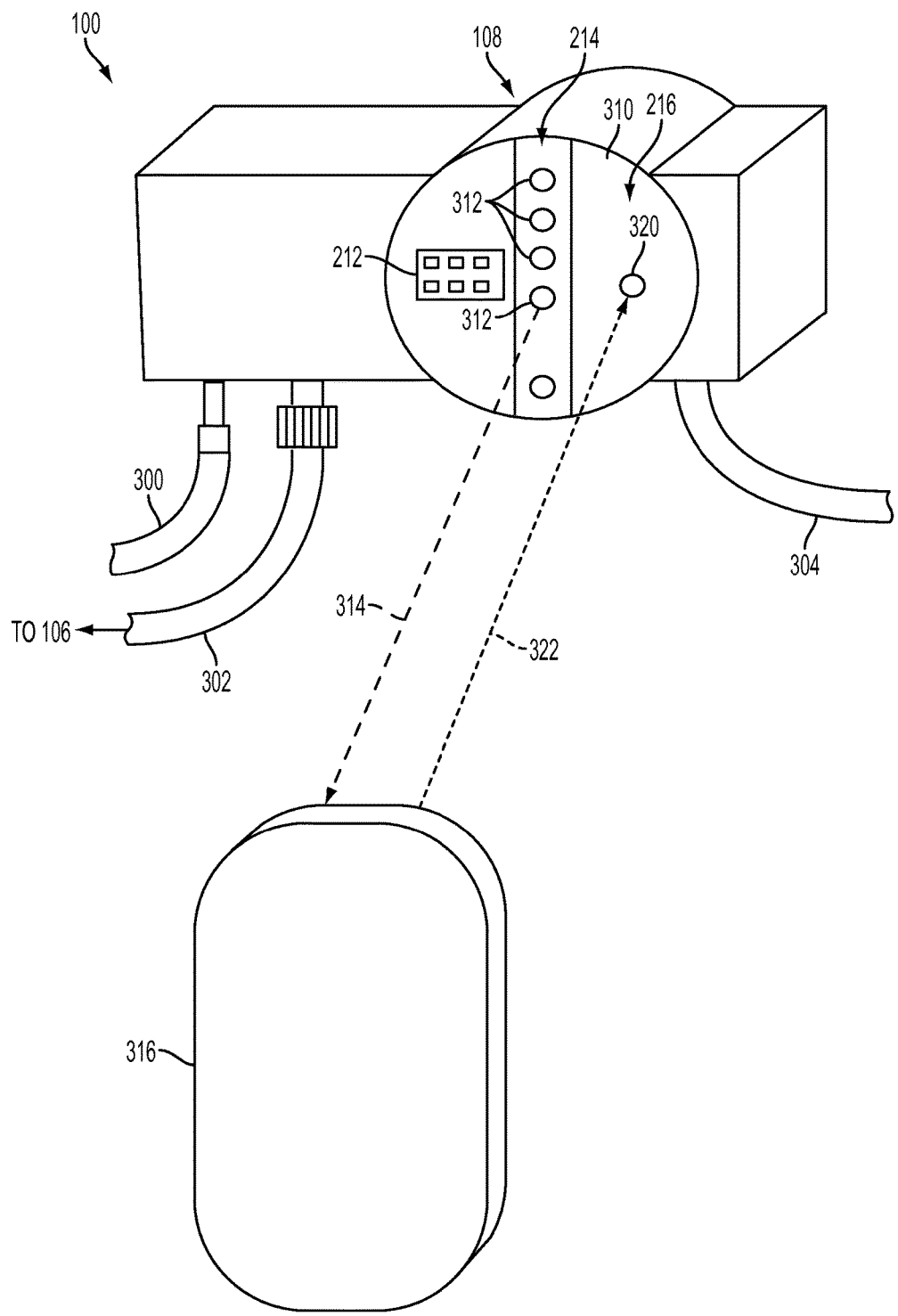
FIG. 3 is an example valve positioner for positioning a valve in a valve positioning system.

Turning to FIG. 3, another example of a portion of the valve positioning system 100 is illustrated. In this example, for the purposes of illustration, the valve positioner 108 is illustrated separate from the valve 102, the pipe 104, the actuator 106, etc. In operation, however, the valve positioning system 100 may include the valve 102, the pipe 104, the actuator 106, the valve positioner 108, etc., in a similar manner as illustrated in FIGS. 1 and 2.

The valve positioning system 100 can include a first air supply 300 and a second air supply 302. The first air supply 300 and the second air supply 302 can include pipes, hoses, tubes, conduits, or the like through which air can be passed. In an example, the first air supply 300 is an air intake supply into which air can be drawn in. The first air supply 300 and the second air supply 302 can be attached to the valve positioner 108. The air from the first air supply 300 can be selectively dispensed to the second air supply 302. The second air supply 302 can be attached to the actuator 106, such that the second air supply 302 can supply air to the actuator 106. A supply 304 can be attached to the valve positioner 108 for providing power and/or data communication to the valve positioner 108.

Focusing upon the valve positioner 108, the valve positioner 108 includes a positioner interface 310. The positioner interface 310 may include a display, a screen, or other similar device for displaying information. The positioner interface 310 can support one or more components, including, for example, the input component 212, the optical transmission component 214, the optical reception component 216, etc.

In this example, the optical transmission component 214 of the valve positioner 108 includes one or more lights 312 supported on the positioner interface 310 of the valve positioner 108. While any number (e.g., one or more) of lights 312 can be provided as part of the optical transmission component 214, in the illustrated example, four lights 312 are provided. The one or more lights 312 can be illuminated to indicate information related to the valve 102. In some examples, this information includes status information (e.g., position of the valve 102, position deviation of the valve 102, time history of the valve 102, air supply information, etc.).

In one possible example, one or more of the lights 312 can be illuminated in such a manner that a user, operator, technician, or other person can see which of the lights 312 are illuminated and/or whether a pattern of illumination of the lights 312 exists. Depending on which of the lights 312 is illuminated, information can be delivered to the user, operator, technician, etc. For example, illuminating a single green light can indicate to the user that the valve positioning system 100 is operating properly. Conversely, illuminating a single red light can indicate to the user that an error condition exists within the valve positioning system 100. The aforementioned illumination scheme (e.g., illuminating a single green light or a single red light) is not intended to be limiting, as other methods, patterns, orders, etc. for illuminating the lights 312 are envisioned. For example, an error condition can be indicated to the user by blinking a red light three times in a row.

In addition to illuminating the one or more lights 312 in a way that is visually readable by the user, the one or more lights 312 can be illuminated in a way that may be machine-readable by a computing device 316 but may or may not be readable by the user. For example, the one or more of the lights 312 can be selectively illuminated in a predetermined order based on the status information of the valve positioning system 100. In this example, the status information can include position information of the valve 102, error information of the valve 102, etc. Also, in some examples, concerning not being readable by the user, the speed and/or patterning of the illumination of the one or more lights 312 may be beyond ability of the user to view, perceive and/or comprehend, thus being readable solely by machine. In an example, the speed of the illumination of the lights 312 includes a blink rate (e.g., a duration of illumination, a time between separate illuminations, etc.) of the lights 312. In such an example, when the blink rate exceeds a predetermined threshold (e.g., 30 blinks/flashes per second, 60 blinks/flashes per second, etc.), a user may not be able to read and/or detect the blinking of the lights 312. In such an example, the lights 312 may appear to a user to be on when, in fact, the lights 312 are blinking/illuminating at a predetermined blink rate. By illuminating the lights 312 in a way that is machine-readable by the computing device 316, it will be appreciated that machine-readability also includes non-human perceivable selective illumination. That is, the lights 312 can be selectively illuminated in a manner as described herein that is non-human perceivable. For example, to provide for non-human perception, the lights 312 can be illuminated at a blink rate that exceeds a predetermined threshold, such that a user cannot read and/or detect the selective illumination of the lights 312.

By selectively illuminating the one or more lights 312 in the predetermined order, the valve positioner 108 can optically transmit 314 the status information to a computing device 316. In this example, the computing device 316 is in an unobstructed line of sight with the one or more lights 312 of the valve positioner 108 such that a camera, photodetector, etc. of the computing device 316 can capture and/or detect the illumination of the one or more lights 312. In such an example, the computing device 316 can detect (e.g., with the camera, photodetector, etc.) which of the lights 312 are illuminated, the order of the lights 312 that are illuminated, a time that the lights 312 are illuminated, etc.

In an example, the computing device 316 can include predetermined information related to the predetermined order of the illumination of the one or more lights 312 and the status information of the valve positioning system 100. For example, the computing device 316 can include predetermined information that correlates one or more predetermined orders of the illumination of the one or more lights 312 with status information of the valve positioning system 100. In one possible example, a first predetermined order of the illumination of the one or more lights 312 is correlated with a first status information of the valve positioning system 100 within the computing device 316. As such, once the computing device 316 detects the order of the lights 312 that are illuminated, the computing device 316 can determine the status of the valve positioning system 100 based on the predetermined information in the computing device 316.

In addition to optically transmitting information, the valve positioning system 100 can optically receive information (e.g., light 322) as well. In this example, the optical reception component 216 can include a photodetector 320. The photodetector 320 can be supported on the positioner interface 310 of the valve positioner 108. While any number (e.g., one or more) of photodetectors 320 can be provided as part of the optical reception component 216, in the illustrated example, one photodetector 320 is provided. The photodetector 320 includes any number of structures/components that can detect/receive light 322 and, in response, generate an electrical signal that is indicative of the detected light. In some examples, the photodetector 320 includes photodiodes, photoresistors, phototransistors, etc.

The photodetector 320 can detect light 322 that is generated by and emitted from the computing device 316. In an example, any number of components of the computing device 316 can generate and emit light, including a flash, a screen, etc. The computing device 316 can include predetermined commands, information (e.g., control information), etc. These commands, information (e.g., control information) can be correlated with the light 322 that is generated by and emitted from the computing device 316. For example, a first command from the computing device 316 can be correlated with the light (e.g., a first blinking pattern of the light, a first timing pattern of the light, etc.). As such, when a user/operator desires to transmit the first command, the computing device 316 can generate and emit the light 322 (e.g., in a first blinking pattern, a first timing pattern, etc.) from the flash, the screen, etc. Also, within some examples, the speed of transmission may be relatively fast (e.g., faster than communication that could be achieved via manual control of light (e.g., in the first blinking pattern, the first timing pattern, etc.) from the flash, the screen, etc.).

The photodetector 320 can detect the light from the computing device 316. In an example, the light that is generated by and emitted from the computing device 316 is indicative of control information. This control information can include, for example, information for controlling the valve positioner, commands requesting a position of the valve, setting parameters (e.g., a maximum and/or a minimum valve position range), running a diagnostic test, etc.

Based on the detection of the light by the photodetector 320, the photodetector 320 can generate an electrical signal indicative of the control information. In some examples, the photodetector 320 can generate a voltage output, a current output, etc. that is indicative of the control information. This electrical signal can be transmitted to the controller 200, whereupon the controller 200 can execute the control information, commands, etc. For example, in response to receiving the control signal, the controller 200 can cause a position of the valve 102 to move, set a parameter (e.g., a maximum and/or a minimum valve position range), request a position of the valve, run a diagnostic test, etc.

Turning to FIGS. 4A to 4D, an example of the optical transmission component 214 is illustrated in which the one or more lights 312 are illuminated in a first predetermined order. In this example, the optical transmission component 214 includes a first light 312a, a second light 312b, a third light 312c, and a fourth light 312d. In this example, the one or more lights 312 can be selectively illuminated in the first predetermined order based on a first status information. The first predetermined order can include a first blinking pattern (e.g., as illustrated in FIGS. 4A to 4D) of the one or more lights 312. In this or other examples, the first predetermined order can include a first blinking rate of the one or more lights 312. The first blinking rate includes a length of time that the one or more lights 312 are illuminated, a time between blinking of the one or more lights, etc.

Referring to FIG. 4A, to transmit the first status information, the first light 312a can be illuminated first. It will be appreciated that the first light 312a, the second light 312b, the third light 312c, and the fourth light 312d include any number of colors, including red colors, green colors, etc. After the first light 312a is illuminated, the second light 312b can be illuminated, as illustrated in FIG. 4B. After the second light 312b is illuminated, the third light 312c can be illuminated, as illustrated in FIG. 4C. After the third light 312c is illuminated, the fourth light 312d can be illuminated, as illustrated in FIG. 4D.

The first predetermined order illustrated in FIGS. 4A to 4D is merely exemplary, as it will be appreciated that any number of blinking patterns, blinking rates, etc. are envisioned. In the example of FIGS. 4A to 4D, the computing device 316 can detect the light that is emitted when the first light 312a is illuminated, when the second light 312b is illuminated, when the third light 312c is illuminated, and when the fourth light 312d is illuminated. In response to detecting the light and the predetermined order of illumination of the lights 312a-312d, the computing device 316 can subsequently determine the first status information of the valve positioning system 100.

Turning to FIGS. 5A to 5D, an example of the optical transmission component 214 is illustrated in which the one or more lights 312 are illuminated in a second predetermined order that is different than the first predetermined order. In this example, the one or more lights 312 can be selectively illuminated in the second predetermined order based on a second status information. The second predetermined order can include a second blinking pattern (e.g., as illustrated in FIGS. 5A to 5D) of the one or more lights 312. In this or other examples, the second predetermined order can include a second blinking rate of the one or more lights 312. The second blinking rate includes a length of time that the one or more lights 312 are illuminated.

Referring to FIG. 5A, to transmit the second status information, the fourth light 312d can be illuminated first. After the fourth light 312d is illuminated, the third light 312c can be illuminated, as illustrated in FIG. 5B. After the third light 312c is illuminated, the fourth light 312d can be illuminated, as illustrated in FIG. 5C. After the fourth light 312d is illuminated, the fourth light 312d can again be illuminated, such as by blinking, as illustrated in FIG. 5D.

The second predetermined order illustrated in FIGS. 5A to 5D is merely exemplary, as it will be appreciated that any number of blinking patterns, blinking rates, etc. are envisioned. In the example of FIGS. 5A to 5D, the computing device 316 can detect the light that is emitted when the fourth light 312d is illuminated, when the third light 312c is illuminated, when the fourth light 312d is illuminated, and when the fourth light 312d is illuminated. In response to detecting the light and the predetermined order of illumination of the lights 312a-312d, the computing device 316 can subsequently determine the second status information of the valve positioning system 100. It will be appreciated that the illustrated examples are not limited to including the number of lights 312a-312d that are illustrated. In another example, the lights may include a single light 312 that is a multi-element light. In such an example, the single light 312 (e.g., the multi-element light) can have a variety of colored elements (e.g., red, green, blue, etc.). The single light 312 can transmit information in a similar manner as described above, such as by illuminating the differently colored elements in the predetermined order and/or at a predetermined rate. As such, information can be transmitted to the computing device 316 with the single light 312.

Figure 6:
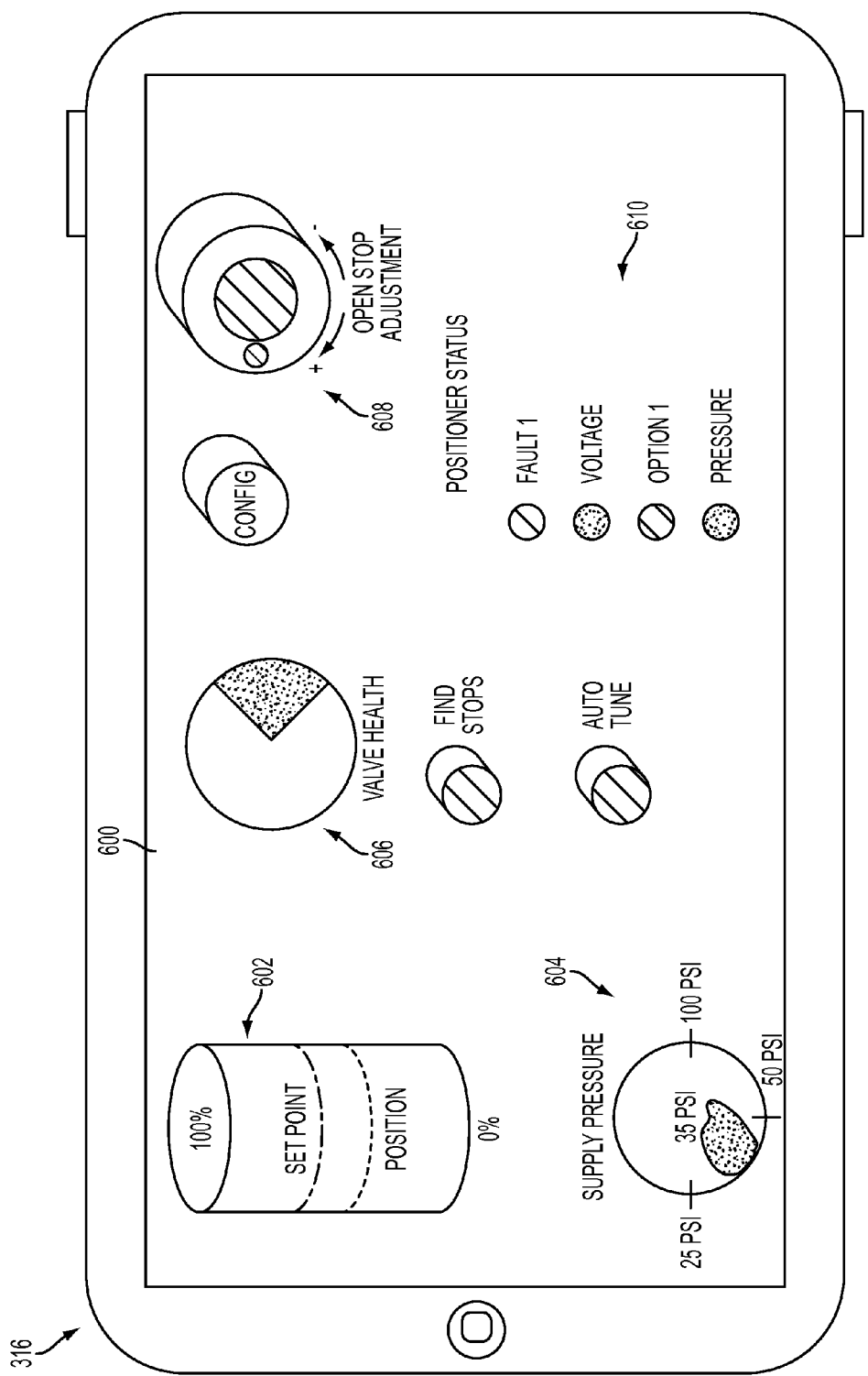
FIG. 6 is an example graphical user interface for displaying information related to the valve positioning system.

Turning now to FIG. 6, an example of a graphical user interface 600 of the computing device 316 is illustrated. In this example, at least some of the status information (e.g., the first status information illustrated in FIGS. 4A to 4D, the second status information illustrated in FIGS. 5A to 5D, etc.) can be displayed on the graphical user interface 600 of the computing device 316. For example, the status information that can be displayed on the graphical user interface 600 can include, but is not limited to, a valve position 602, an air supply pressure 604, valve health 606, a valve adjustment setting 608 and/or a positioner status 610.

Figure 7:
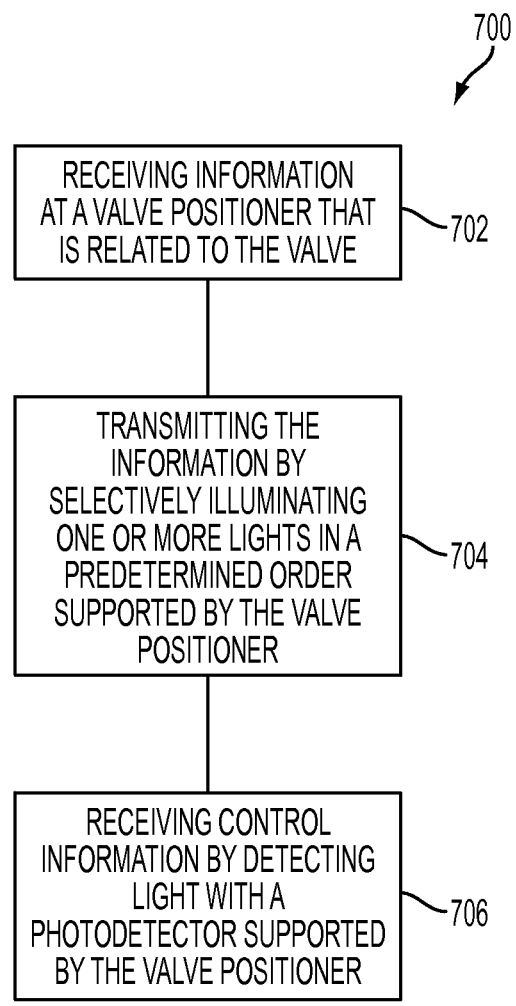
FIG. 7 is a flow chart for an example method of exchanging information related to a valve in a valve positioning system.

Turning now to FIG. 7, an example method 700 of exchanging information related to the valve 102 in the valve positioning system 100 is illustrated. In an example, the method 700 includes a step 702 of receiving information at the valve positioner 108 that is related to the valve 102. In such an example, the valve positioner 108 may include the controller 200, such that the controller 200 can receive the information related to the valve 102. In some examples, this information includes, but is not limited to, the valve position, the valve health, an air supply pressure of the actuator 106, etc.

The method 700 includes, at step 704, transmitting the information by selectively illuminating one or more lights 312 in a predetermined order supported by the valve positioner 108. As illustrated in FIGS. 3, 4 and 5, the valve positioner 108 can support the one or more lights 312. The lights 312 can be selectively illuminated in the predetermined order (e.g., in the first predetermined order as illustrated in FIGS. 4A to 4D, in the second predetermined order as illustrated in FIGS. 5A to 5D, etc.). In an example, this predetermined order may be based on the status information. For example, a first predetermined order can be based on a first status information (e.g., a first valve position, a first air supply pressure, etc.) while a second predetermined order can be based on a second status information (e.g., a second valve position, a second air supply pressure, etc.). In such an example, the first predetermined order (and, thus, the first status information) is different than the second predetermined order (and, thus, the second status information).

The method 700 includes, at step 706, receiving control information by detecting light with the photodetector 320 that is supported by the valve positioner 108. The photodetector 320 can be supported on the positioner interface 310 of the valve positioner 108. The computing device 316 can generate and emit light in a direction towards the photodetector 320. In an example, the computing device 316 can generate the light (e.g., with a flash, etc.) at a first blinking pattern, a first timing pattern, etc. This light can be received by the photodetector 320, with an electrical signal generated by the photodetector 320 in response. The electrical signal can be transmitted to the controller 200. In some examples, the controller 200 can correlate this electrical signal with a command, such as a command to move the valve 102 to a desired position, to set a parameter of the valve 102, run a diagnostic test, etc. In response, after correlating the electrical signal with the command, the controller 200 can execute the command.

The valve positioning system 100 provides a number of benefits for exchanging information between the valve positioning system 100 and the user, and also for exchanging information between the valve positioning system 100 and the computing device 316. For example, the exchange of information between the valve positioning system 100 and the computing device 316 can occur when the computing device 316 is in a line of sight with the valve positioner 108. Indeed, the computing device 316 can be in a line of sight with the one or more lights 312 and with the photodetector 320. As such, information can be transmitted between the valve positioning system 100 and the computing device 316 with limited risk of crosstalk between the computing device 316 and another, unintended, valve positioning system. Further, by exchanging this information optically and not wirelessly (e.g., with Bluetooth, with radio waves, etc.), the likelihood of crosstalk between the computing device 316 and other, unintended, valve positioning systems is reduced.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

The invention claimed is:
1. A system, including:
   a valve assembly comprising,
      a valve;

a pneumatic actuator coupled with the valve, the pneumatic actuator configured to use air pressure to open and close the valve;
a valve positioner coupled with the pneumatic actuator and having ports to connect with an air supply, the ports accommodating a first air supply through which air flows into the valve positioner and a second air supply through which the valve positioner can selectively dispense air from the first air supply to the pneumatic actuator so as to change position of the valve in response to status information related to the valve, the valve positioner including,
a forward face,
a column of individual lights outwardly facing from the forward face, with all of the individual lights substantially aligned along its diameter, the individual lights all configured to be selectively illuminated, individually or in combination with others in the column of individual lights, in a predetermined order based on the status information, the predetermined order comprising a first mode wherein a first light of the column of individual lights is illuminated and a second light of the column of individual lights is not illuminated, and a second mode wherein the first light of the column of individual lights is not illuminated and the second light of the column of individual lights is illuminated; and,
a controller disposed inside of the valve positioner and operatively connected to the column of individual lights so as to control the selective illumination of the individual lights in the predetermined order so that the predetermined order optically transmits status information for the valve in a way that is imperceptible to humans; and
a computing device that, when positioned in spaced relation to the valve positioner and in a line of sight with the column of individual lights of the valve positioner, can optically receive the selective illumination and decode the status information.

2. The system of claim 1, wherein the status information includes position information of the valve.

3. The system of claim 1, wherein the status information includes error information of the valve.

4. The system of claim 1, wherein the status information includes a first status information and a second status information.

5. The system of claim 4, wherein the predetermined order includes a first predetermined order and a second predetermined order, the column of individual lights configured to be selectively illuminated in the first predetermined order based on the first status information, the column of individual lights configured to be selectively illuminated in the second predetermined order based on the second status information.

6. The system of claim 5, wherein the first predetermined order includes a first blinking rate of the column of individual lights, the second predetermined order includes a second blinking rate of the column of individual lights.

7. The system of claim 6, wherein the first blinking rate is different than the second blinking rate.

8. The system of claim 5, wherein the first predetermined order includes a first blinking pattern of the column of individual lights, the second predetermined order includes a second blinking pattern of the column of individual lights.

9. The system of claim 8, wherein the first blinking pattern is different than the second blinking pattern.

10. The system of claim 1, wherein the computing device includes a mobile device.

11. The system of claim 1, wherein the selective illumination of the column of individual lights in the predetermined order is machine-readable.

12. A system, including:
a valve;
a pneumatic actuator coupled with the valve; and
a valve positioner coupled with the pneumatic actuator and having ports to connect with an air supply, the ports accommodating a first air supply through which air flows into the valve positioner and a second air supply through which the valve positioner can selectively dispense air from the first air supply to the pneumatic actuator valve so as to change position of the valve in response to status information related to the valve, the valve positioner including:
a forward face,
a column of individual lights outwardly facing from the forward face, with all of the individual lights valve positioner substantially aligned along its diameter, the individual lights all and that are configured to be selectively illuminated, individually or in combination with others in the column of individual lights, in a predetermined order based on the status information related to the valve, wherein, by selectively illuminating the lights in the predetermined order, the valve positioner is configured to optically transmit the status information, the predetermined order comprising a first mode wherein a first light of the column of individual lights is illuminated and a second light of the column of individual lights is not illuminated, and a second mode wherein the first light of the column of individual lights is not illuminated and the second light of the column of individual lights is illuminated;
a controller disposed inside of the valve positioner and operatively connected to the column of individual lights so as to control the selective illumination of the individual lights in the predetermined order so that the predetermined order optically transmits status information for the valve in a way that is imperceptible to humans;
and a photodetector outwardly facing from the forward face the valve positioner and configured to detect light, based on control information for controlling the valve positioner, that is generated by a computing device in a line of sight with the photodetector, wherein, based on the detection of the light by the photodetector, the photodetector is configured to generate an electrical signal indicative of the control information.

13. The system of claim 12, wherein the photodetector includes at least one of a photodiode, a photoresistor, or a phototransistor.

14. The system of claim 12, wherein the valve positioner is configured to optically transmit the status information to the computing device that is in a line of sight with the column of individual lights of the valve positioner.

15. The system of claim 14, wherein the status information is configured to be displayed on a graphical user interface of the computing device.

16. The system of claim 12, wherein the computing device includes a mobile device.

17. The system of claim 12, wherein the selective illumination of the one or more lights in the predetermined order is machine-readable.

18. The system of claim 12, wherein the valve positioner includes a positioner interface.

19. The system of claim 18, wherein the positioner interface supports the column of individual lights and the photodetector.

* * * * *